United States Patent
Shi et al.

(10) Patent No.: US 9,989,801 B2
(45) Date of Patent: Jun. 5, 2018

(54) INVERTED LCD STRUCTURE FOR VR

(71) Applicant: Oculus VR, LLC, Menlo Park, CA (US)

(72) Inventors: Jianru Shi, Union City, CA (US); Mary Lou Jepsen, Sausalito, CA (US)

(73) Assignee: Oculus VR, LLC, Menlo Park, CA (US)

( * ) Notice: Subject to any disclaimer, the term of this patent is extended or adjusted under 35 U.S.C. 154(b) by 44 days.

(21) Appl. No.: 15/219,168

(22) Filed: Jul. 25, 2016

(65) Prior Publication Data

US 2017/0277000 A1  Sep. 28, 2017

Related U.S. Application Data

(60) Provisional application No. 62/325,898, filed on Apr. 21, 2016, provisional application No. 62/312,207, filed on Mar. 23, 2016.

(51) Int. Cl.
| | |
|---|---|
| *G02F 1/1335* | (2006.01) |
| *G06T 19/00* | (2011.01) |
| *G09G 3/36* | (2006.01) |
| *G02F 1/1368* | (2006.01) |
| *G02B 5/08* | (2006.01) |

(52) U.S. Cl.
CPC ..... *G02F 1/133553* (2013.01); *G02B 5/0825* (2013.01); *G02F 1/1368* (2013.01); *G02F 1/133514* (2013.01); *G06T 19/006* (2013.01); *G09G 3/3648* (2013.01); *G09G 2300/0452* (2013.01)

(58) Field of Classification Search
CPC .................................................. G02F 1/133553
See application file for complete search history.

(56) References Cited

U.S. PATENT DOCUMENTS

| | | | | |
|---|---|---|---|---|
| 6,025,899 A | * | 2/2000 | Fukunaga | G02F 1/133514 349/106 |
| 6,208,466 B1 | * | 3/2001 | Liu | G02B 5/021 359/584 |
| 6,239,856 B1 | * | 5/2001 | Imura | G02F 1/1309 349/192 |
| 9,268,068 B2 | * | 2/2016 | Lee | G02B 5/0825 |
| 9,465,248 B2 | * | 10/2016 | Minowa | G02F 1/133514 |
| 2009/0244441 A1 | * | 10/2009 | Nagato | G02F 1/13475 349/78 |
| 2010/0309413 A1 | * | 12/2010 | Jang | G02F 1/1334 349/86 |
| 2012/0120351 A1 | * | 5/2012 | Kawata | G02F 1/13737 349/105 |

(Continued)

*Primary Examiner* — Sang V Nguyen
(74) *Attorney, Agent, or Firm* — Fenwick & West LLP

(57) ABSTRACT

A liquid crystal display (LCD) is configured for use in a head mounted display (HMD) to increase the brightness and improve power consumption of the LCD by recycling light. The LCD includes a color filter (CF) substrate, a thin film transistor (TFT) substrate, and a backlight unit (BLU). The CF substrate is closer to the BLU than the TFT substrate. The CF substrate includes a first reflective layer in regions of the CF substrate between pixels to reflect light back towards the BLU to be recycled to increase the brightness of the LCD. The TFT substrate includes TFTs to drive the pixels and a second reflective layer covering TFTs to reflect light away from the TFTs.

16 Claims, 4 Drawing Sheets

(56) References Cited

U.S. PATENT DOCUMENTS

2014/0071550 A1* 3/2014 Lee .................. G02B 5/0825
                                             359/839
2015/0042932 A1* 2/2015 Minowa ............ G02F 1/133514
                                             349/106
2017/0184848 A1* 6/2017 Vallius .................. G02B 3/14
2017/0221943 A1* 8/2017 Yamazaki ........... H01L 27/1464
2017/0276844 A1* 9/2017 McCoy ................. G02B 5/128

* cited by examiner

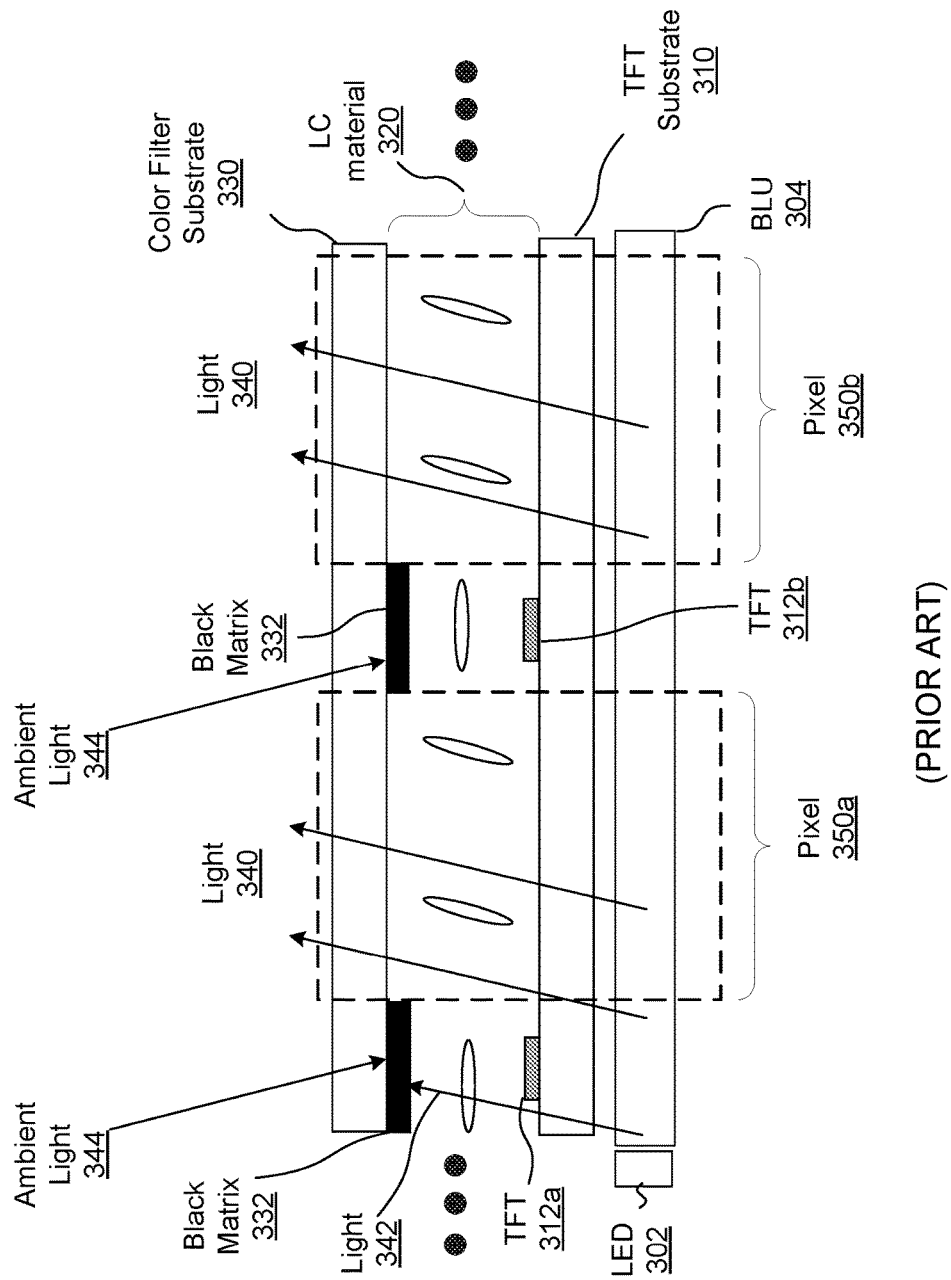

INVERTED LCD STRUCTURE FOR VR

CROSS-REFERENCE TO RELATED APPLICATION

This application claims the priority benefit of U.S. Provisional Patent Application No. 62/312,207 filed on Mar. 23, 2016 and U.S. Provisional Patent Application No. 62/325,898 filed on Apr. 21, 2016, both of which are incorporated herein by reference for all purposes as if fully set forth herein.

BACKGROUND

The present disclosure generally relates to enhancing a Liquid Crystal Display (LCD) for use in a virtual reality (VR), mixed reality (MR), or augmented reality (AR) system. LCDs used in VR, MR, and AR systems require high resolutions. However, factors limiting high resolution displays include the size of thin film transistors (TFT) and aperture ratio (ratio of the emissive area to the sum of the emissive area and non-emissive area) of the display. The size of TFTs is limited to relatively larger TFT sizes due to use of larger channel width for high speed electronic signal propagation. The aperture ratio of the display is dependent on the size of the TFTs (accounting for a larger non-emissive area) as well as the alignment error between the color filter substrate and the TFT substrate of the LCD which can be several micrometers. These factors limit the brightness of the display (smaller aperture ratio result in less bright displays for a given backlight unit) and increase the power consumption of the display (require backlight unit to be driven at higher power for more light output).

SUMMARY

A liquid crystal display (LCD) includes a liquid crystal (LC) panel and a backlight unit. The LC panel includes a thin film transistor (TFT) substrate including a plurality of TFTs disposed on the TFT substrate for driving a plurality of pixels, a color filter (CF) substrate, and LC material disposed between the CF substrate and the TFT substrate. The CF substrate is closer to the backlight unit than the TFT substrate. The CF substrate may include a reflective layer in regions of the CF substrate between a plurality of pixels to reflect light from the BLU back towards the BLU to increase the brightness of the LCD. The TFT substrate may include a reflective layer in regions of the TFT substrate covering a plurality of TFTs to shield the plurality of TFTs from light exiting the BLU. The CF substrate may not include a black matrix. The LCD may be configured for use in a head mounted display (HMD).

BRIEF DESCRIPTION OF THE DRAWINGS

FIG. 3 is a cross section of a conventional LCD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
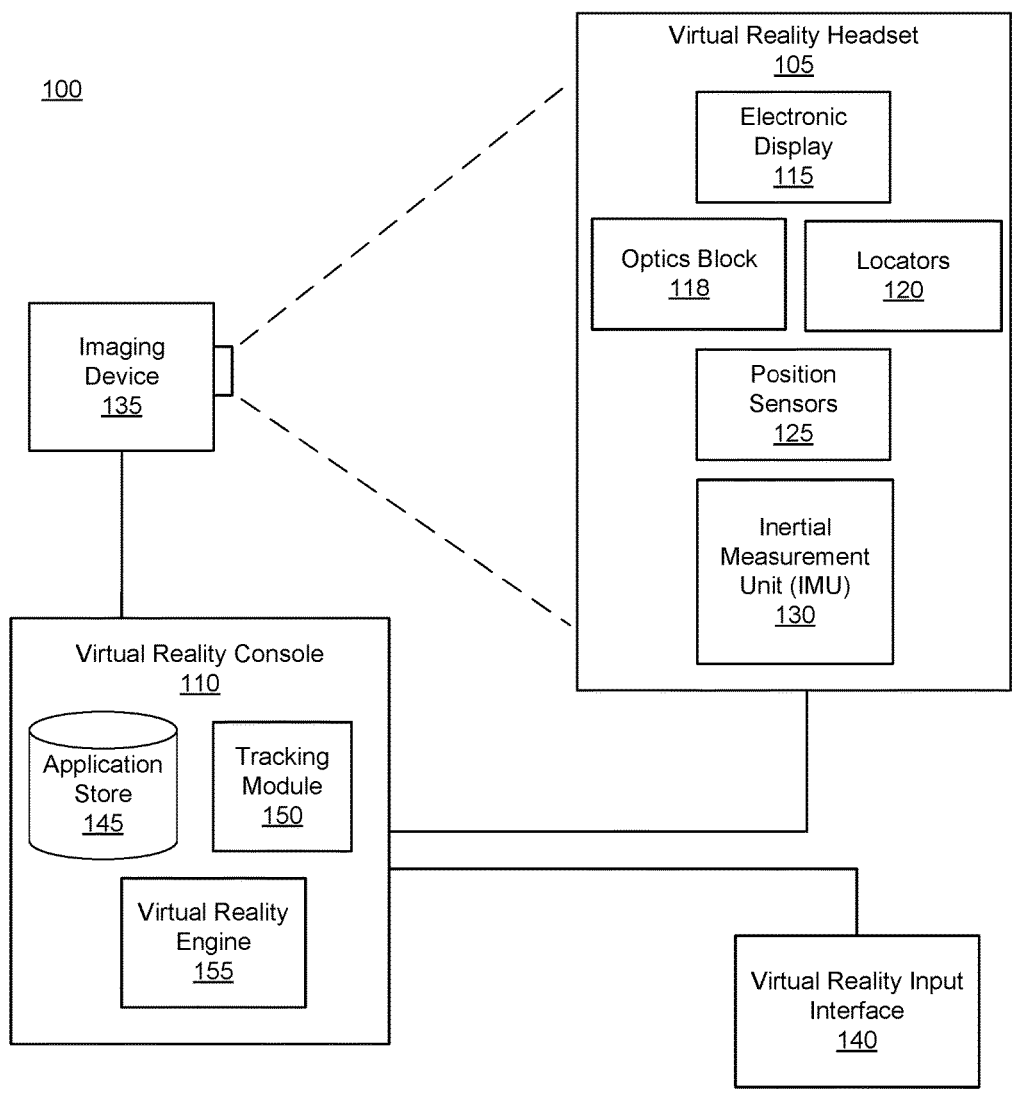
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., an electronic display for each eye of a user).

An electronic display 115 may be a liquid crystal display (LCD), an organic light emitting diode (OLED) display, an active-matrix organic light-emitting diode display (AMOLED), a TOLED, some other display, or some combination thereof.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
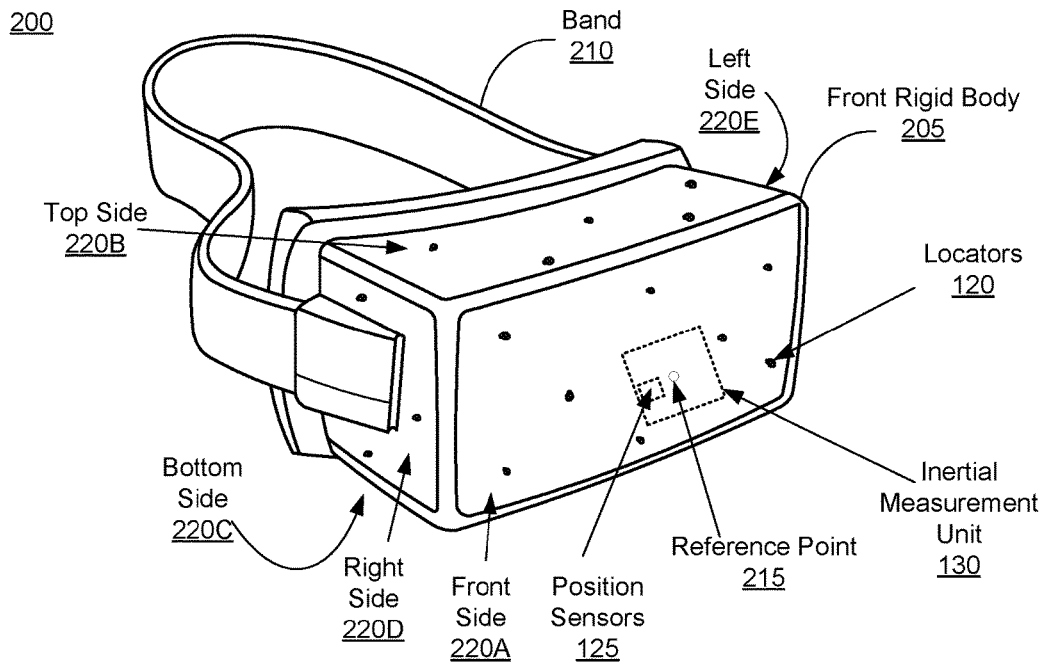
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes an electronic display 115, the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
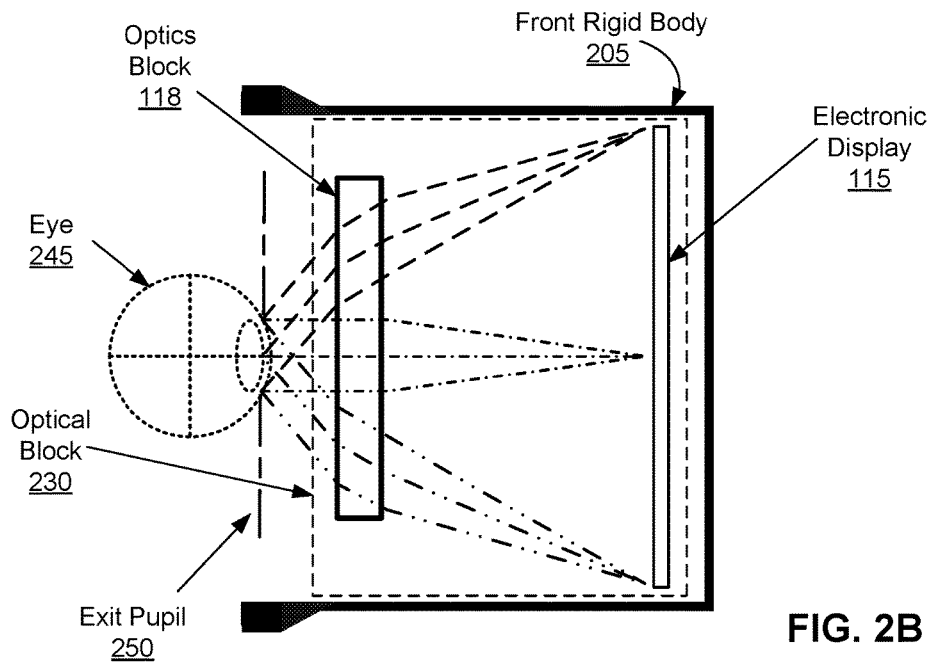
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display 115, and the optics block 118. The electronic display 115 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

High Pixel Density LCDs

The electronic display 115 in a VR headset may be a liquid crystal display (LCD) and may have certain requirements for high pixel density. However, as pixel density increases, the aperture ratio decreases which may also decrease the brightness of the LCD. The aperture ratio is ratio of the light emitting area of a pixel to the whole area of a pixel, including non-emissive regions of the pixel. For an LCD, the emitting pixel area is the transparent area, and the whole pixel area is the transparent area plus the wiring and thin film transistor (TFT) area of the pixel. With higher pixel density, the whole area of a pixel gets smaller while the pixel's wiring and TFT area is limited by technology and may not decrease, resulting in smaller aperture ratios for higher pixel density LCDs. While smaller aperture ratios may be preferred for high pixel density LCDs to hide pixel crosstalk (light signal from one pixel interfering with a neighboring pixel or sub-pixel's signal), smaller aperture ratios may result in lower brightness since less light can be transmitted through the transparent portion of the LCD. A high density LCD with an inverted LCD structure may have improved brightness over a high density LCD with a conventional LCD structure.

Conventional LCD Structure

A conventional LCD structure may include a twisted nematic (TN), vertical alignment (VA), In-plane switching (IPS) or fringe field switching (FFS) type liquid crystal (LC) material. For simplicity, the structure of an LCD with a TN LC material is described, but other embodiments may relate to inverting conventional structures of an LCD containing other LC materials.

A conventional LCD may include a LC panel and a backlight unit (BLU). The LC panel may include a TFT substrate, a CF substrate, a polarizer, and LC material between the TFT and CF substrates. The backlight unit (BLU) provides light to the LC panel. The bottom substrate of the LC panel may be the TFT substrate that includes the driver pixel circuitry and a transparent pixel electrode. The cover glass or top substrate of LC panel may be the CF substrate that may include color filters, a black matrix, transparent conductive electrodes, and spacers to control the spacing between the top substrate and the bottom substrate. The LC material is placed between the CF substrate and the TFT substrate. A voltage may be applied across electrodes on the TFT substrate and CF substrate to change the orientation of LC material at each pixel of the LCD, changing the polarization of light emitted from the backlight passing through the LC material. The light exiting the CF substrate may pass through or get absorbed by a polarizer on the top substrate of the LC panel before reaching the eye of a user.

FIG. 3 is a cross section of a conventional LCD. The LCD includes a plurality of pixels, and two pixels of the plurality of pixels, pixel 350a and pixel 350b, are shown in this cross section. The LCD includes an LED 302, a BLU 304, TFT substrate 310, TFT 312a, TFT 312b, LC material 320, CF substrate 330, and black matrix 332. Although the conventional LCD includes a polarizer and may include other components, these components are not shown in the cross section. The BLU 304 comprises a bottom reflective sheet (not shown) and a light guide plate (not shown) covering the bottom reflective sheet. The LED 302 is positioned at the edge of the BLU 304 and emits light into the light guide plate of the BLU 304. Although depicted as separate components, the LED 302 and BLU 304 may be combined to be a single component. The light guide plate uniformly distributes the light in the area of the display to be illuminated. Light that enters the light guide plate may reflect off the bottom reflective sheet before exiting the upper surface of the light guide plate and BLU 304. Light 340 exits the BLU 304 to enter the TFT substrate 310, passes through the LC material 320 and may change in polarization, and exits the CF substrate 330. The black matrix 332 is located on the CF substrate 330 in the area between pixels. The black matrix 332 may absorb light 342 to prevent light leakage from the display in the non-emissive pixel area and is also aligned to TFT 312a and TFT 312b on the TFT substrate 310 to provide a light shield for TFT 312a and TFT 312b from ambient light 344 entering the display through CF substrate 330 from sources external from the display (e.g., sunlight or building light) to reduce photoconductivity effects of TFT 312a and TFT 312b.

Inverted LCD Structure

An inverted LCD structure according to embodiments herein includes components similar to the conventional LCD structure, but the inverted LCD structure places the CF substrate closer to the BLU than the TFT substrate (e.g., the CF substrate may be used as a bottom substrate and the TFT substrate may be used as a cover glass or top substrate for the LCD). The inverted LCD structure may include a first reflective layer in regions of the CF substrate between the pixels (in place of or covering the black matrix). Ambient light may not enter the LCD when used in an HMD, since the ambient light is removed from the viewing environment. The first reflective layer may allow light from the BLU which would normally be absorbed (by a TFT or black matrix) to be reflected back towards the BLU to be recycled. The light reflected back towards the BLU may reflect off the bottom reflective sheet of the BLU and exit the LCD in the transparent regions of the panel, or may continue to reflect off the first reflective layer or bottom reflective sheet of the BLU until the light exits the panel. Because light from the BLU is recycled via the dielectric mirrors, the LCD with an inverted structure may increase in brightness. The inverted LCD structure may include a second reflective layer covering a plurality of TFTs disposed on the TFT substrate. The second reflective layer may reflect light away from the plurality of TFTs. This reflected light may exit the display or may continue to reflect off of one or more reflective layers and/or bottom reflective sheet before exiting the display and may contribute to increased brightness of the display.

In one embodiment, a LCD device has an inverted LCD structure. The LCD device includes an LC panel and a BLU disposed under the LC panel. The LC panel may include a thin film transistor (TFT) substrate including a plurality of TFTs disposed on the TFT substrate to drive a plurality of pixels, a CF substrate, and LC material disposed between the CF substrate and the TFT substrate. The CF substrate of the LC panel is closer to the BLU than the TFT substrate. The CF substrate may include a first reflective layer in regions of the CF substrate between the plurality of pixels. The first reflective layer may be a dielectric mirror or a metal mirror. The CF substrate may have a first surface and a second surface opposite the first surface, and the first reflective layer may be disposed on the first surface of the CF substrate adjacent to the LC material. The TFT substrate may include a second reflective layer in regions of the TFT substrate covering the plurality of TFTs. The second reflective layer may be a dielectric mirror. The second reflective layer may be deposited on top of the TFT as a dielectric mirror cap for the TFT. The dielectric mirror cap may be preferred for its high electrical resistance over using a metal mirror; the conductive properties of a metal mirror may interfere with circuitry on the TFT substrate. The TFT substrate may have a third surface and a fourth surface opposite the third surface, and the plurality of TFTs and the second reflective layer may be disposed on the third surface of the TFT substrate adjacent to the LC material. The CF may not include a black matrix. The LCD may be included in an optics block configured to direct light from the LC display to an exit pupil of the HMD.

In one embodiment, the LCD device includes an LC panel and a BLU disposed under the LC panel. The LC panel includes a thin film transistor (TFT) substrate including a plurality of TFTs disposed on the TFT substrate to drive a plurality of pixels, a CF substrate including a first reflective layer in regions between the plurality of pixels, and LC material disposed between the CF substrate and the TFT substrate. The first reflective layer may be configured to reflect light from the backlight unit back towards the backlight unit to increase light output from the LCD device. The first reflective layer may be a dielectric mirror or a metal mirror. The CF substrate has a first surface and a second surface opposite the first surface, and the first reflective layer may be disposed on the first surface of the CF substrate adjacent to the LC material. The CF substrate may not include a black matrix. The TFT substrate may include a second reflective layer in regions of the TFT substrate covering the plurality of TFTs.

In one embodiment, the LCD device includes an LC panel and a BLU disposed under the LC panel. The LC panel includes a CF substrate, a TFT substrate including a plurality of TFTs disposed on the TFT substrate to drive a plurality of pixels and a first reflective layer covering the plurality of TFTs, and LC material disposed between the CF substrate and the TFT substrate. The first reflective layer is configured to reflect light from the backlight unit away from the plurality of TFTs. The first reflective layer may be a dielectric mirror. The TFT substrate has a first surface and a second surface opposite the first surface, and the plurality of TFTs and the first reflective layer may be disposed on the first surface of the TFT substrate adjacent to the LC material. The CF substrate may include a second reflective layer in regions of the CF substrate between the plurality of pixels.

Figure 4:
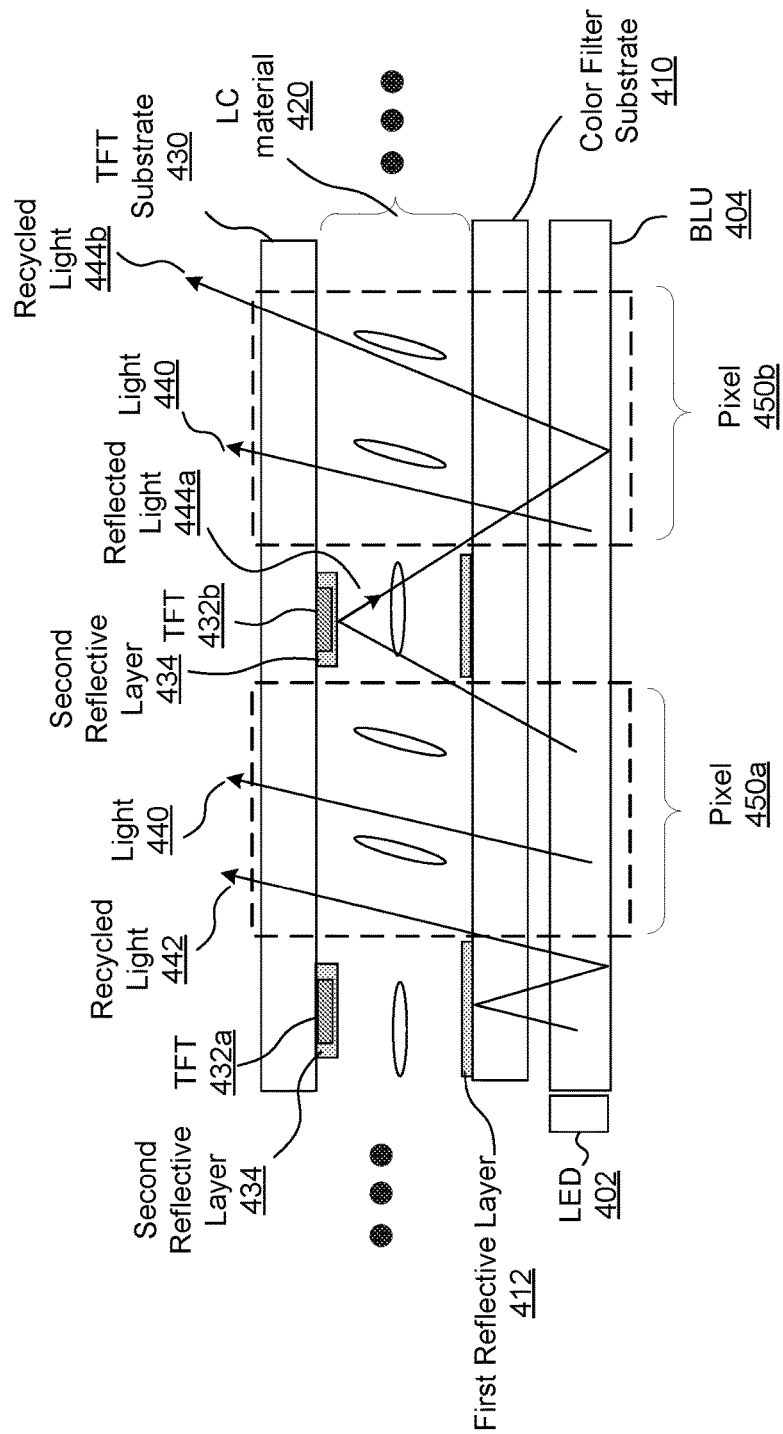
FIG. 4 is a cross section of an inverted LCD, according to one embodiment.

FIG. 4 is a cross section of an inverted LCD, according to one embodiment. The LCD includes a plurality of pixels, and two pixels of the plurality of pixels, pixel 450a and pixel 450b, are shown in this cross section. The inverted LCD structure includes an LED 402, BLU 404, CF substrate 410, first reflective layer 412, LC material 420, TFT substrate 430, TFT 432a, TFT 432b, and a second reflective layer 434. The LED 402, BLU 404, and LC material 420 are similar to the LED 302, BLU 304 and LC material 320 of FIG. 3 except that these components are used for FIG. 4, and therefore, the detailed description thereof is omitted herein for the sake of brevity. Light 440 exits the BLU 404 to pass through the CF substrate 410, passes through the LC material 420 and may change polarization, and also passes through the TFT substrate 430. The first reflective layer 412 is positioned on the CF substrate 410 to align with the non-transparent regions of the pixel such as areas which include wires or driving TFTs (e.g., TFT 432a and TFT 432b) on the TFT substrate 430. The first reflective layer 412 may prevent light leakage from the display in the non-emissive pixel area and may also provide a light shield for the TFTs from the light exiting BLU 404. Recycled light 442 exits the BLU 404 by reflecting off the first reflective layer 412 and a bottom reflective sheet (not shown) of the BLU 404 and exits the BLU 404, passes through the CF substrate 410, passes through the LC material 420 and may change polarization, and also passes through the TFT substrate 430. A second reflective layer 434 may cover the TFT 432a and TFT 432b on the TFT substrate 430. The second reflective layer 434 may also shield the TFT 432a and TFT 432b from light exiting the BLU 354, a feature the conventional structure does not provide. For example, reflected light 444a exits the BLU 404, passes through the CF substrate 410 and LC material 420, and reflects off the second reflective layer 434 covering TFT 432b, the second reflective layer 434 providing a light shield for TFT 432b. Light reflected by the second reflective layer 434 may also contribute to the recycled light of the display. For example, once the reflected light 444a reflects off the second reflective layer 434, the reflected light 444a may pass through the LC material 420 and CF substrate 410, enter the BLU 404, reflect off the bottom reflective sheet (not shown) of the BLU 404, exit the BLU 404, pass through the CF substrate 410, pass through the LC material 420 and may change polarization, and pass through the TFT substrate 430 to exit the TFT substrate as recycled light 444b. In this embodiment, the shielding function of the black matrix from FIG. 3 is not needed to block ambient light entering the display through TFT substrate 430 from sources external from the display (e.g., sunlight or building light) since in a VR headset worn by the user, the sources of external light is minimized.

While the embodiment of FIG. 4 shows the inclusion of a first reflective layer 412 and a second reflective layer 434, other embodiments may include only one reflective layer (a first or a second reflective layer). While one reflective layer may serve the purpose for increasing brightness in a LCD, having both a first and a second reflective layer may allow for additional advantages such as increased light recycling from the first reflective layer 412 while providing more thorough shielding of TFT 432a and TFT 432b with the second reflective layer 434 being in closer proximity of TFT 432a and TFT 432b than the first reflective layer 412.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A liquid crystal display device, comprising:
    a liquid crystal panel including:
        a thin film transistor (TFT) substrate including a plurality of TFTs disposed on the TFT substrate for driving a plurality of pixels of the liquid crystal panel;
        a color filter substrate including a first reflective layer in regions of the color filter substrate between the plurality of pixels, wherein the color filter substrate further comprises a first surface and a second surface opposite the first surface, and the first reflective layer is disposed on the first surface of the color filter substrate and is in contact with liquid crystal material; and
        the liquid crystal material disposed between the color filter substrate and the TFT substrate; and
    a backlight unit disposed under the liquid crystal panel, wherein the color filter substrate of the liquid crystal panel is closer to the backlight unit than the TFT substrate.

2. The liquid crystal display device of claim 1, wherein the first reflective layer is a dielectric mirror.

3. The liquid crystal display device of claim 1, wherein the first reflective layer is a metal mirror.

4. The liquid crystal display device of claim 1, wherein the TFT substrate further comprises a second reflective layer in regions of the TFT substrate covering the plurality of TFTs.

5. The liquid crystal display device of claim 4, wherein the second reflective layer is a dielectric mirror.

6. The liquid crystal display device of claim 4, wherein the TFT substrate further comprises a third surface and a fourth surface opposite the third surface, and the plurality of TFTs and the second reflective layer are disposed on the third surface of the TFT substrate adjacent to the liquid crystal material.

7. The liquid crystal display device of claim 1, wherein the color filter substrate does not include a black matrix.

8. A head-mounted display (HMD) including the liquid crystal display device of claim 1 and an optics block configured to direct light from the liquid crystal display to an exit pupil of the HMD.

9. A liquid crystal display device, comprising:
a liquid crystal panel including:
a thin film transistor (TFT) substrate including a plurality of TFTs disposed on the TFT substrate to drive a plurality of pixels;
a color filter substrate including a first reflective layer in regions between the plurality pixels, wherein the color filter substrate further comprises a first surface and a second surface opposite the first surface, and the first reflective layer is disposed on the first surface of the color filter substrate and is in contact with liquid crystal material; and
the liquid crystal material disposed between the color filter substrate and the TFT substrate; and
a backlight unit disposed under the liquid crystal panel, wherein the first reflective layer is configured to reflect light from the backlight unit back towards the backlight unit to increase light output from the liquid crystal display device.

10. The liquid crystal display device of claim 9, wherein the first reflective layer is a dielectric mirror.

11. The liquid crystal display device of claim 9, wherein the first reflective layer is a metal mirror.

12. The liquid crystal display device of claim 9, wherein the color filter substrate does not include a black matrix.

13. The liquid crystal display device of claim 9, wherein the TFT substrate further comprises a second reflective layer in regions of the TFT substrate covering the plurality of TFTs.

14. A liquid crystal display device, comprising:
a liquid crystal panel including:
a color filter substrate;
a thin film transistor (TFT) substrate including a plurality of TFTs disposed on the TFT substrate to drive a plurality of pixels and a first reflective layer covering the plurality of TFTs, wherein the TFT substrate further comprises a first surface and a second surface opposite the first surface, and the plurality of TFTs and the first reflective layer are disposed on the first surface of the TFT substrate adjacent to liquid crystal material; and
the liquid crystal material disposed between the color filter substrate and the TFT substrate; and
a backlight unit disposed under the liquid crystal panel, wherein the first reflective layer is configured to reflect light from the backlight unit away from the plurality of TFTs.

15. The liquid crystal display device of claim 14, wherein the first reflective layer is a dielectric mirror.

16. The liquid crystal display device of claim 14, wherein the color filter substrate further comprises a second reflective layer in regions of the color filter substrate between the plurality of pixels.

* * * * *